Nov. 24, 1936.  F. W. COTTERMAN  2,061,832
POWER TRANSMISSION MECHANISM
Filed Dec. 26, 1934  5 Sheets-Sheet 1

Fig. 1.

INVENTOR
Frederick W. Cotterman

Patented Nov. 24, 1936

2,061,832

UNITED STATES PATENT OFFICE 2,061,832

POWER TRANSMISSION MECHANISM

Frederick W. Cotterman, Dayton, Ohio, assignor of one-half to Bessie D. Apple, Dayton, Ohio Application December 26, 1934, Serial No. 759,173

28 Claims. (Cl. 74—336)

The mechanism herein disclosed relates to power transmission gearing particularly applicable to motor vehicle construction and embodies some of the features of my Patents Nos. 1,978,834, 1,981,823 and 2,018,488.

An object is to provide a four forward speed transmission comprising two gear sets in series, the one controlled by a manually operable gear shift lever and the other by an automatic clutch, the manually operable lever being arranged to be shifted from a forward to a rearward position thereby changing from first speed to second speed, and the automatic clutch being arranged to directly connect the first and last gears of the other gear set thereby providing a third speed if engagement takes place when the manually shiftable set is in first speed position, but providing a fourth speed if engagement take place when the manually shiftable set is in second speed position.

Another object is to provide, in the automatic clutch, means which will automatically change from one to another speed ratio whenever the relation between the power applied and the load opposing it is such that use of a different ratio is desirable, but which means may nevertheless be subject to the will of the operator in that he may, by suddenly changing the amount of applied power by means of the throttle, cause the automatic clutch to change the speed ratio then in effect to one that to him seems more desirable.

Another object is to provide an automatic gear set in which the first gear and the last gear are connectible directly by a centrifugal clutch for high speed or are connectible through intermediate gears for low speed, and providing the gears with helical teeth, then employing the axial thrust due to the tangential load on the gear teeth to oppose engagement of said centrifugal clutch whereby engagement of said clutch for direct drive is delayed longer as the load is greater.

Another object is to provide an automatic gear set that will change to direct drive when the power being generated overbalances the power then needed and change to gear drive when the power needed overbalances the power then being generated, but to so proportion the parts that one must overbalance the other by a considerable percent before a change takes place, to the end that too frequent changes and consequent wear may not be had.

Another object is to provide, in a gear mechanism which automatically changes from gear drive to direct drive and vice versa, means for making the change from one drive to the other without a time interval between them, the one drive always becoming effective before the other lets go, to the end that there will be no time between direct drive and gear drive in which there is no drive, as there is in conventional gear shift transmissions.

Another object is to provide an unique arrangement of the several parts of the automatic gear mechanism whereby the greatest power transmitting capacity is had in the smallest space.

Another object is to provide an unique structure in the manually operable gear set for shifting the gearing.

I attain the foregoing objects together with other meritorious features in the mechanism hereinafter described, reference being had to the drawings, wherein.

Similar numerals refer to similar parts throughout the several views.

Figure 1:
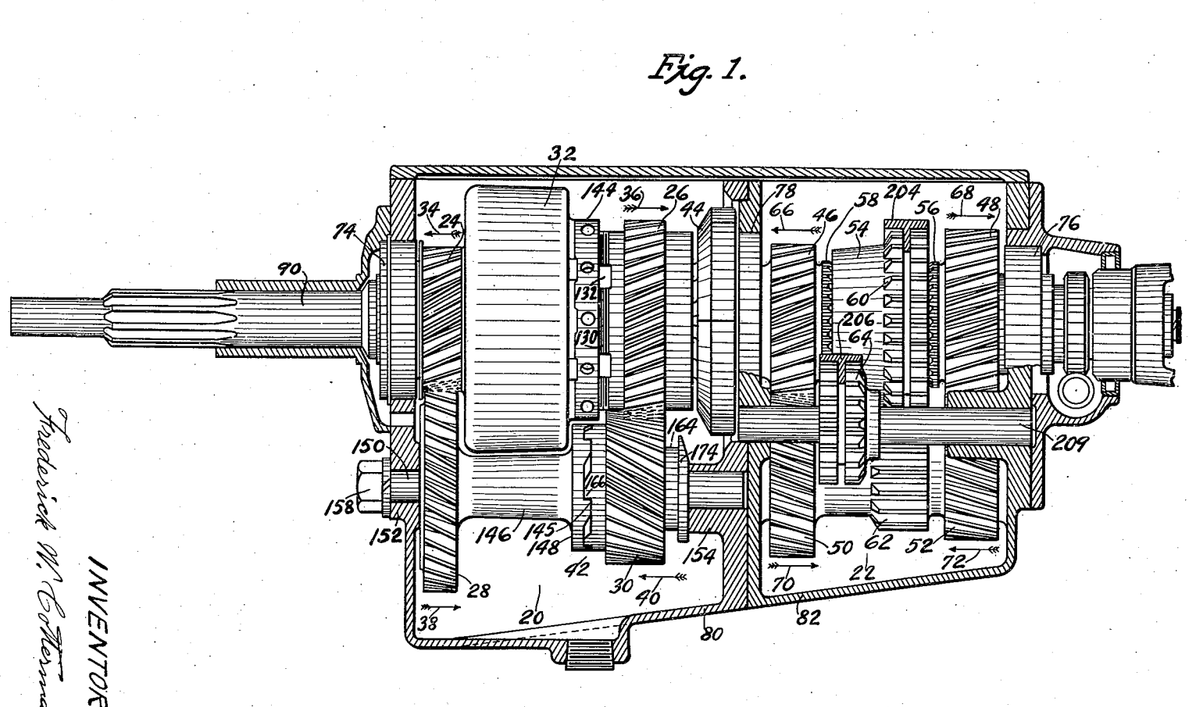
Fig. 1 is an elevation of the mechanism with the housing broken away to show the gearing in full view.

Referring more particularly to Fig. 1, the mechanism comprises two gear sets connected in series, an automatically operative set broadly designated by the numeral 20 and a manually operative set broadly designated by the numeral 22. Helical silent gears are employed in both gear sets and the teeth are cut at such an angle that the axial thrusts of the gears closely balance each other.

In the automatically operative gear set 20, the driving gear 24 normally drives the driven gear 26 at a reduced speed through the countershaft gears 28 and 30. The driving gear 24 may also drive the driven gear 26 at the same speed through the automatic multiple disc clutch 32. When clutch 32 is engaged the gear 24 drives the gear 28 without load and the gear 26 drives the gear 30 without load. The gear 30 is then revolving somewhat faster than the gear 28.

The angles of the helical teeth of gears 24, 26, 28 and 30 are such that the axial thrust of the gears is in the direction of the arrows 34, 36, 38 and 40 respectively. Thus, when carrying load, the gear 26 is thrust rearwardly and the gear 30 is thrust forwardly. The forward thrust of the gear 30 maintains engagement of the jaw clutch 42 while the rearward thrust of the gear 26 allows the discs of the clutch 32 to separate, whereby it is completely disengaged.

The centrifugally operative weights 44 are arranged to move away from the axis of rotation and force the gear 26 forwardly at the same time that the load carried by the gear is forcing it rearwardly.

Whenever the forward force of the weights overcomes the rearward force of the load, the discs of the clutch 32 will be pressed into contact and the clutch will become engaged. Therefore the miles per hour of vehicle speed at which the clutch 32 engages to change from gear drive to direct drive is higher when the accelerator pedal is pressed harder because the rearward thrust on the gear 26 is then greater.

When the weights 44 have forced the gear 26 forward against its rearward thrust and have thereby engaged the clutch 32 and effectuated direct drive, the gear 26 will drive the gear 30 whereas theretofore the gear 30 had been driving the gear 26. As soon as the gear 26 drives the gear 30, the gear 30 will be thrust rearward, oppositely of the arrow 40, and the jaw clutch 42 will become disengaged due to the overrunning of its teeth allowing the gear 30 to revolve faster than it would be driven by the gear 28. The jaw clutch 42 can reengage thereafter only when the gear 28 tries to surpass the gear 30 in speed. The jaw clutch 42 will therefore reengage only when the speeds of gears 28 and 30 are substantially synchronized.

In the manually operative gear set 22, the driving gear 46 drives the driven gear 48 through the countershaft gears 50 and 52. A synchromesh collar 54 may be moved rearwardly over clutch teeth 56 for gear drive or forwardly over clutch teeth 58 for direct drive. A spur gear 60 on the synchromesh collar 54 and a spur gear 62 on the countershaft are joinable by the sliding idler gear 64 for reversing (see Fig. 7). The thrusts of the gears 46, 48, 50 and 52 are in the direction of the arrows 66, 68, 70 and 72 respectively. The face of the gear 62 is wider than the face of the gear 60 for a reason which will appear when the operation of the mechanism is hereinafter described.

Gears 26 and 46 are secured to the same shaft so that they must always rotate together although the gear 26 has a slight axial movement relative to the gear 46.

Inasmuch as each succeeding gear carries a greater pitch line load, it is necessary that the tooth angle is less as the gear is nearer the rear of the transmission in order that the axial thrust of all gears may be substantially the same. As the angles progressively decrease toward the rear of the transmission the gears should be wider in proportion, in order that the end of one tooth overlaps the beginning of the next. The wider gears then carry the greater tangential load but the thrust on all gears is nearly equal.

It will be apparent that the tooth angles are such that the thrust of gear 28 balances that of gear 30; that the thrust of gear 50 balances that of gear 52; that the thrust of gear 26 balances that of gear 46; and that the thrusts of gears 24 and 48 are taken by the antifriction bearings 74 and 76 respectively. The center antifriction bearing 78 is not required to take any thrust load, nor is there at any time any substantial end thrust on the countershaft hubs.

Figures 2, 3, 4, 5:
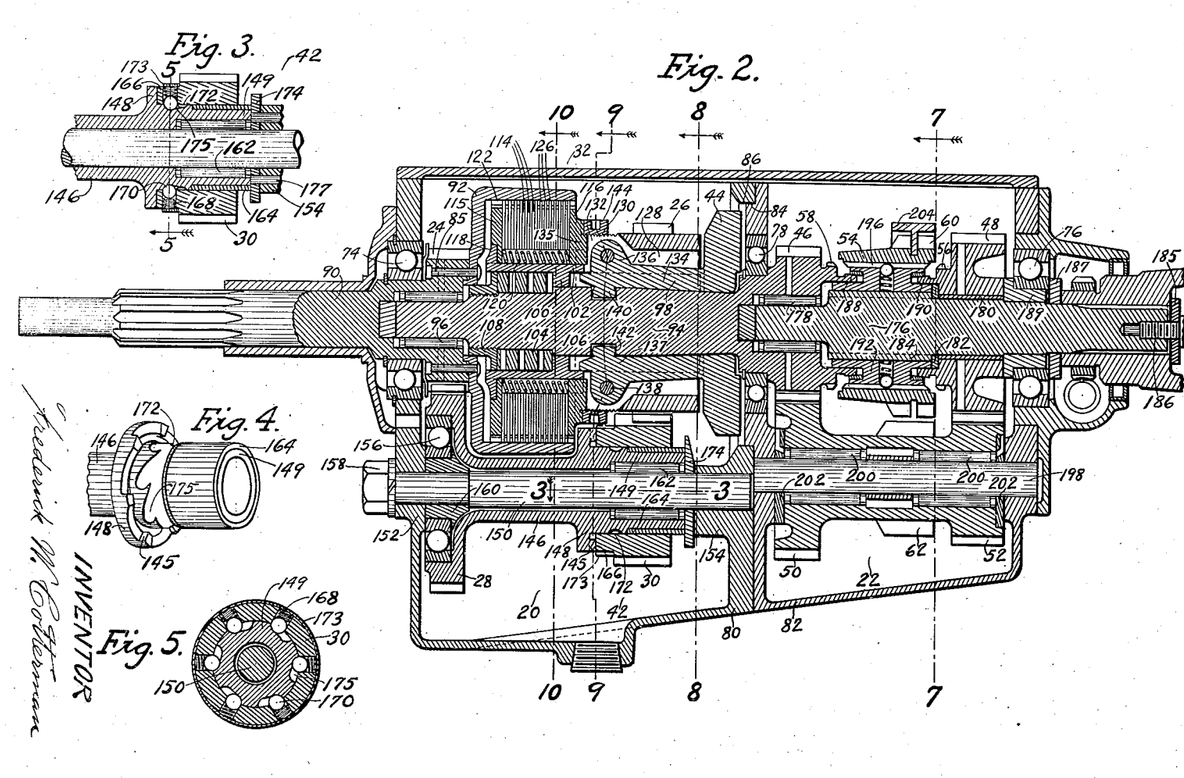
Fig. 2 is a longitudinal-vertical axial section through the mechanism.
Fig. 3 is a fragmentary horizontal section taken at 3—3 of Fig. 2 showing the jaw clutch mechanism.
Fig. 4 is a perspective view of the hub of the jaw clutch.
Fig. 5 is a transverse section at 5—5 of Fig. 3 through the jaw clutch.

Referring now to Fig. 2, a housing 80 and a housing 82 are joined together so that their main shaft bearings are in axial alignment although the countershaft bearings are not. An annular pilot 84 on housing 82 extends into the large bore 86 of housing 80 and maintains alignment.

The housing 80 carries ball bearing 74 which is of the kind capable of taking both radial and thrust loads. Bearing 74 rotatably supports the drive shaft 90 of the gear set 20. Drive shaft 90 carries the driving gear 24 and the clutch drum 92. The clutch drum 92 is drivably secured to the gear 24 by the rivets 85.

The driven shaft 94 of the gear set 20 which is also the drive shaft 94 of the gear set 22 is rotatably supported at the rear end by the radial ball bearing 78 and at the front end by the roller bearing 96. At its middle portion the shaft 94 is considerably enlarged (see Figs. 8 and 9) but has deep keyways 98 extending the entire length of the enlarged portion.

A clutch member 100 has short end keys 102 slidably fitted into the ends of deep internal keyways 128 in gear 26, whereby gear 26 and member 100 are drivably connected but have slight axial movement with respect to each other. The front of member 100 is hollowed to receive the heavy coil spring 104 which is held in compression between the shoulder 106 of the shaft 94 and the nut 108.

The outside of the clutch member 100 has external teeth 110 (see Fig. 10) into which the internal teeth 112 of the driven clutch discs 114 are slidably fitted. Two end discs 115 and 116 (see Fig. 2) are thicker than the discs 114. A shoulder 118 prevents the discs sliding forward off of the member 100 when they are pressed together. The outside diameter of the driven clutch discs 114 and 116 is small enough to clear the clutch drum teeth 122.

At six equally spaced points around the periphery of the clutch member 100 (see Fig. 10) an external tooth 110 is cut away. At the same six points a portion of two clutch disc internal teeth 112 is also cut away.

But the two thicker end discs 115 and 116 do not have this part of the teeth cut away (see Fig. 2). The cut away portions provide space for the springs 120 which are held under compression between the two heavy end discs 115 and 116.

The clutch drum 92 carries the internal teeth 122 between which the teeth 124 of the driving clutch discs 126 are slidably fitted. The inner diameter of the driving clutch discs 126 is somewhat larger than the outside diameter over the teeth 110 of member 100.

Figure 8:
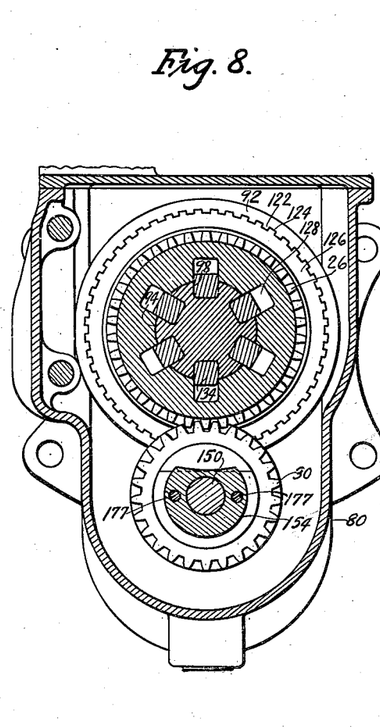
Fig. 8 is a transverse section taken through the speed-torque clutch control mechanism at 8—8 of Fig. 2.
Figure 9:
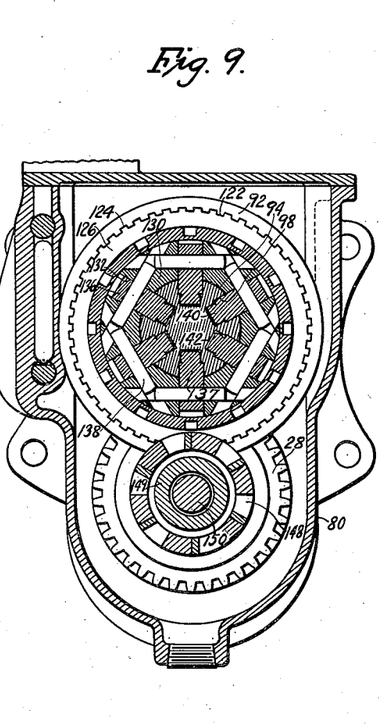
Fig. 9 is a transverse section taken through the speed-torque clutch control mechanism at 9—9 of Fig. 2.

The driven gear 26 has an internal diameter which is slidably fitted to the enlarged part of the shaft 94 (see Fig. 8). Six deep keyways 128 are spaced around this internal diameter of the gear 26. The forward hub 130 of the gear 26 has six radial slots 132 (see Figs. 2 and 9) corresponding to the six deep keyways 128. Six centrifugal weights 44 each have a square shank 134 and a hinge ear 136. The hinge ears 136 fit the radial slots 132 closely but movably, while the six square shanks 134 fit the deep keyways 128 rather loosely.

Hinge pins 138 extend transversely through the holes in the hinge ears 136 and the hub 130 to provide hinges upon which the weights 44 may swing outwardly. The inner portions of the hinge ears 136 extend into the deep keyways 98 of shaft 94 at 137, these parts serving as keys to drivably connect the gear 26 to the shaft 94. The extreme inner ends of the ears 136 have ball shaped ends 140 which extend into holes 142 in the shaft 94. Heavy clutch plate 116 has six radial keys 135 on its rear face. These keys extend into the radial slots 132 of the gear 26.

It will be seen that the member 100 is keyed to the gear 26 by the keys 102, that the plate 116 is keyed to the gear 26 by the keys 135, and that the member 100 and the plate 116 are keyed to each other by the teeth 110, but that member 100, plate 116 and gear 26 all have slight axial movement with respect to each other. A clutch adjusting nut 144 has threaded bearing on the hub 130.

By placing the long shanks 134 of the weights 44 in the keyways within the gear 26 a considerable shortening of the device results, for if the gear structure and the weight structure were placed end to end, instead of one within the other, the end room taken would be substantially doubled. With the structure shown, a reasonably small weight exerts a considerable axial pressure on the clutch discs owing to the great distance between the center of gravity of the weight masses and their hinge pins as compared with the distance from the hinge pins to the ball ends 140.

Gear 28 has a long rearwardly extending tube 146 upon which the jaw clutch part 148 having teeth 145 is carried. A hub 149 extends further rearwardly from the clutch part 148. A countershaft 150 is held stationary in the hubs 152 and 154 of the housing 80. At the forward end, the inner race of the ball bearing 156 is held stationary by clamping it by means of the nut 158 between the collar 160 and the hub 152. A roller bearing 162 rotatably supports the hub 149.

Rotatably mounted on the outside of the hub 149 is the gear 30. A bronze bushing 164, press fitted over the hub 149, provides adequate bearing surface inasmuch as the gear 30 never rotates on the bushing except when it is under no load.

On the forward end of the gear 30 are jaw clutch teeth 166 corresponding to the jaw clutch teeth 145. Radial openings contain the small springs 168 which press the balls 170 into an annular groove 172 in hub 149 to provide a light friction between the gear 30 and the hub. A circular band 173 closes the outer ends of the radial openings to keep the springs and balls in place.

At equally spaced points around the hub 149, the groove 172 is extended forwardly and somewhat helically to form pockets 175 which act as guideways and into which the balls 170, acting as followers may move to carry the gear 30 forwardly on the bushing 164. Pockets 175 are slightly deeper at the forward ends than they are where they join the groove 172 so that the pressure of the springs 168 on the balls 170 creates a tendency to move the gear 30 forwardly irrespective of any other force. An end thrust washer 174 holds both gears 28 and 30 against rearward movement. Pins 177 extend through the washer 174 and into the hub 154 to hold the washer against rotation.

The pockets 175 are so located with respect to the clutch teeth 145, and the balls 170 are so located with respect to the clutch teeth 166, that the balls may enter the pockets only when the engaging surfaces of the respective teeth are approaching each other but are still rotatably displaced considerably from the point of engagement. This arrangement effectually prevents the teeth 166 engaging the teeth 145 on their respective points, that is, with a shallow bite, because if the guiding means comprising the balls and pockets permits the teeth 166 to enter between the teeth 145 at all the teeth will be fully entered by the guiding means before they reach their point of engagement.

The pockets 175 have the function of a coarse multiple screw, and the balls 170 of an appropriate nut, each having the same multiple thread as there are teeth 145 in the jaw clutch, the screw threads being cut integral with the teeth so that they may never become rotatably displaced relative thereto, and the nut being capable of running off the end of the threaded part as when the balls 170 run into the groove 172, in which case rotation of the screw produces no further axial movement of the nut. If, upon reverse rotation, the balls fail to start properly by reason of striking the ends of the ridges between the pockets 175, the balls will merely rise over the said ridges, due to the yielding of the springs 168 and will then start in the adjoining pockets. In any event, when the balls reach their limit of helical travel, the clutch teeth will be fully and correctly meshed.

This is important, because if the teeth 166 engage the teeth 145 with too shallow a bite, as for instance a bite of about .005 inch there is danger that the teeth may first assume the load then slip off each other and thereby create a jerk in the carrying of the load.

When rotative force is applied to the pinion shaft 90, it is transmitted through gears 24, 28, 30, 26, through keys 137 to the shaft 94 which is thereby rotated at a lower speed than the shaft 90.

Due to the axial thrust of the gear 30 the jaw clutch 42 is maintained tightly in engagement once it is engaged and due to the axial thrust of the gear 26 the weights 44 are pressed tightly inward against the shaft 94, the intensity with which the weights are held inward being proportioned to the power being transmitted by the gears.

If and when the vehicle gains sufficient speed with the power then being applied to cause the centrifugal weights 44 to urge the gear 26 forwardly more forcibly than the torque being transmitted is urging it rearwardly, the gear 26 will move forwardly and press the clutch discs 114 and 126 together.

As soon as the weights 44 succeed in engaging the friction clutch 32, even though but lightly, there is just so much less torque load on the gears and therefore so much less opposition to the clutch engaging force. Less opposition to the clutch engaging force results in so much more clutch engagement, which in turn removes so much more load from the gears which permits still further clutch engagement and so on through a period of several seconds in which all of the load is removed from the gears and is being carried by the clutch.

Now at the instant that the friction clutch 32 becomes sufficiently engaged to cause the gear 24 to drive the gear 26 at the slightest increase in rotative speed over what it was being driven through the countershaft gears, all load is removed from the gearing and the gear 26 begins driving the gear 30 where an instant before the gear 30 was driving the gear 26.

When the gear 30 begins revolving faster than the hub 149 the clutch teeth 166 act against the clutch teeth 145 and move the gear 30 rearwardly. At the same time the action of the gear 26 driving the gear 30 creates an end thrust which also urges the gear 30 rearwardly. The result is that when the clutch teeth 145 and 166 have moved the gear 30 as far rearwardly as they may, the helical gear teeth and the grooves 175 move it slightly farther and maintain it in a position which clears the clutch teeth in which the gear 30 is against the thrust washer 174 and the balls are being pressed lightly against the bottom of the groove 172 creating for the gear 30 a very light resistance to rotation which in turn maintains a light axial thrust rearward on the gear.

At a relatively low driving speed this light friction becomes zero due to the centrifugal force of the balls 170, and thereafter the friction is merely such as is caused by the gear 30 revolving under zero load somewhat faster than the hub 149 upon which it is rotatably mounted.

The weight of the balls 170 is preferably so determined that the centrifugal force of the balls overcomes the springs 168 and eliminates the ball friction at speeds of 35 M. P. H., or over.

It will be seen that the speed at which the automatic gear set changes from gear to direct drive depends upon the rotative force being applied to the shaft 90, the angle of the helical teeth of the gear 26 which receives this force, and the size of the weights 44 which oppose the axial gear reaction to the force.

With any given constant rotative force applied to the shaft 90 against a vehicle resistance which permits acceleration by that force through the gearing, a speed will eventually be reached at which the gears can no longer prevent the weights from transferring the load to the clutch 32. When the load is once taken up by the clutch 32 the gearing is idle and has no influence whatever to disengage the clutch to change back to gear drive unless and until the clutch slips slightly under load. Therefore the proportion between the helix angle, the weights and the clutch 32 is preferably such that the gear holds the weights until they generate a clutch engaging force substantially double that necessary to enable the clutch to carry the then existing torque load.

It then follows that, with the same constant power applied to the shaft 90, a change back to gear drive will occur upon such an increase in vehicle resistance as will reduce the vehicle speed by one-fourth, which will in turn decrease the clutch engaging force of the weights by one-half and thereby allow the clutch to slip slightly. But a shift back to gear drive may also occur immediately after a shift up by rather suddenly doubling the power then applied to the shaft 90 and thereby slipping the clutch.

Of course there comes a vehicle speed at which the weights 44 will generate so great a force that all of the power which is available to apply to the shaft 90 will not slip the clutch against the clutch engaging force of the weights.

When from either of the above causes the applied power overbalances the then existing clutch engaging pressure sufficiently to slip the clutch slightly, a shift down to gear drive involves the following action:

The clutch 32 slips and, inasmuch as static friction is greater than moving friction, when the clutch lets go and slips at all the shaft 90 rapidly gains in speed on the shaft 94. This causes the hub 149 which was revolving somewhat slower than the gear 30 to catch up to it, and, through friction of the balls 170, the hub 149 drives the gear 30 against the resistance of the gear 26 which, due to the angle of its helical teeth starts the gear 30 forwardly after which the pockets 175 complete its movement. The gear 30 is further urged forwardly somewhat by the balls 170 due to the fact that the bottom of the pockets 175 are inclined toward the front end.

The result is the gear moves and engages the teeth 166 and 145. As soon as this occurs the gear 30 drives the gear 26 under load which forces the gear 30 forwardly with great enough force to balance the rearward thrust of the gear 28 under the same load. The gear 26 is also forced rearwardly with sufficient force to press the weights 44 tightly against the shaft 94 which holds the clutch 32 wide open.

It should here be noted that this transfer from gear drive to direct drive takes place without a time interval between the two drives within which there is no connection between the engine and the vehicle. First the gear drive alone is operative, then both gear and direct drive operate together for an instant, then the gear drive lets go and the direct drive alone is operative. This quality is not had in an automotive transmission of the conventional design in the operation of which there is always an interval between gear drive and direct drive when there is no drive in effect, a condition which is recognized to be a source of danger, inasmuch as it sometimes becomes desirable, in an emergency, to instantly apply power and when this occurs at a time when gear shifting is taking place an accident often results.

Of course any mechanism which will transfer from a friction clutch drive to a gear drive and vice versa, and which will overlap in so doing as does the herein described mechanism must permit some clutch slip in the transfer, whether up or down, but it should be noted that the slippage under load of the plates of clutch 32 is but of a few seconds duration no matter under what speed or torque condition the transfer occurs. This feature insures long life to the clutch.

The driven shaft 176 of the gear set 22 at its forward end has rotative bearing on the roller bearing 178 and at its rearward end on the ball bearing 76. The gear 48 rotates freely about the bronze bushing 180 which is secured to the shaft 176 by clamping together the bushing and the thrust washer 182 against the ends of the splines 184 of the shaft by means of the screw 186 and intermediate parts 185, 187 and 189.

Gear 46 carries the positive clutch teeth 58 and the friction clutch cone 188, while the gear 48 carries similar clutch teeth 56 and a similar cone 190. A collar 192 is axially slidable on the shaft 176 on splines 184. The outer collar 54 is axially slidable on the inner collar 192 on intermeshing clutch teeth 196. The gear 60 is formed on the outer periphery of the collar 54.

The countershaft gears 50, 52 and 62 are integral and rotate about the stationary countershaft 198 on the roller bearings 200. Thrust washers 202 take any slight unbalance in the thrusts of gears 50 and 52. When the collar 54 is moved rearwardly by the shifting fork 204 until the clutch teeth 196 and 56 engage, then the shaft 176 will be connected to the gear 48 for gear drive. When the collar 54 is moved forwardly by the shifting fork 204 until the clutch teeth 196 and 58 engage, then the shaft 176 will be connected to the gear 46 for direct drive. When the collar 54 is thus moved for direct drive the gear 60 does not touch the reverse idler gear 64 (see Fig. 1).

Reversing may be done only by leaving the gear 60 in the neutral position shown in Fig. 1 and moving the idler gear 64 rearwardly into mesh with it by means of the shifting fork 206. The idler gear 64 has a bronze bushing 207 and is freely rotatable and axially slidable on the stationary shaft 209.

Figure 6:
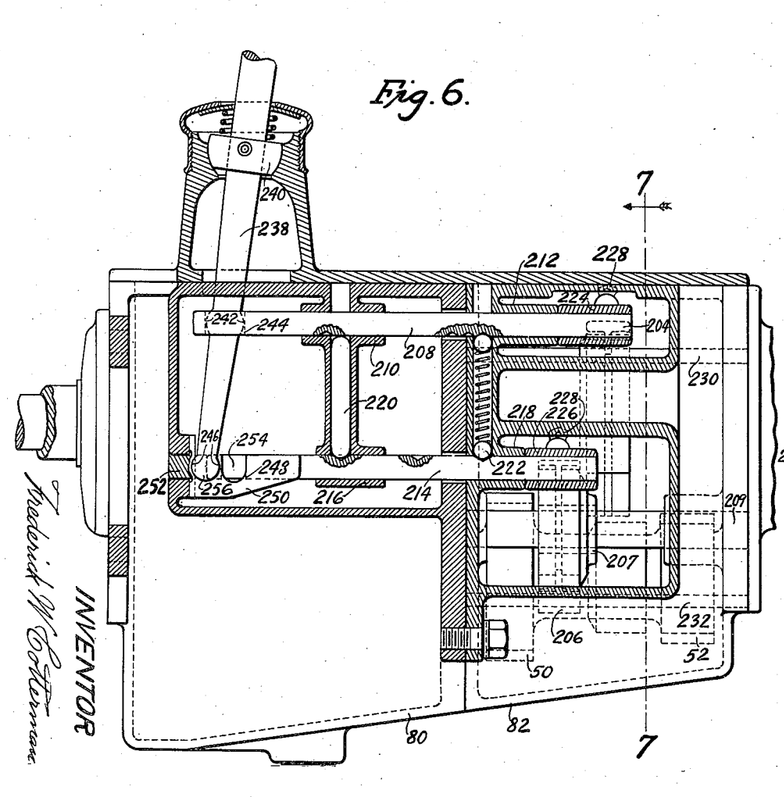
Fig. 6 is a longitudinal-vertical section through the shifting rod bearings taken at 6—6 of Fig. 7.
Figure 7:
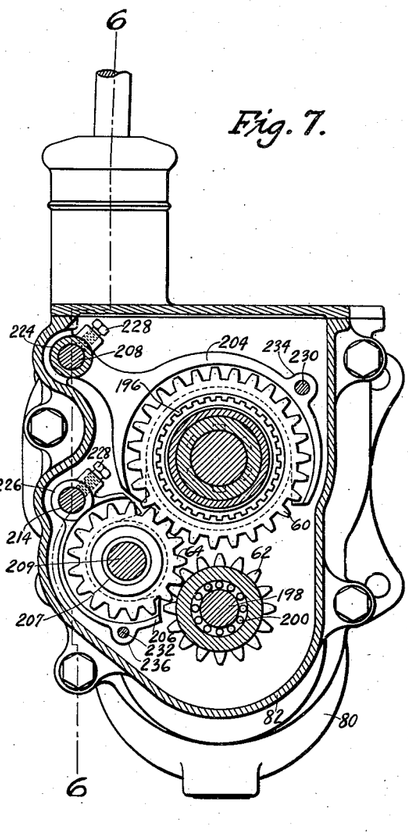
Fig. 7 is a transverse section taken through the manually shiftable gear set at 7—7 of Figs. 2 and 6.
Figure 10:
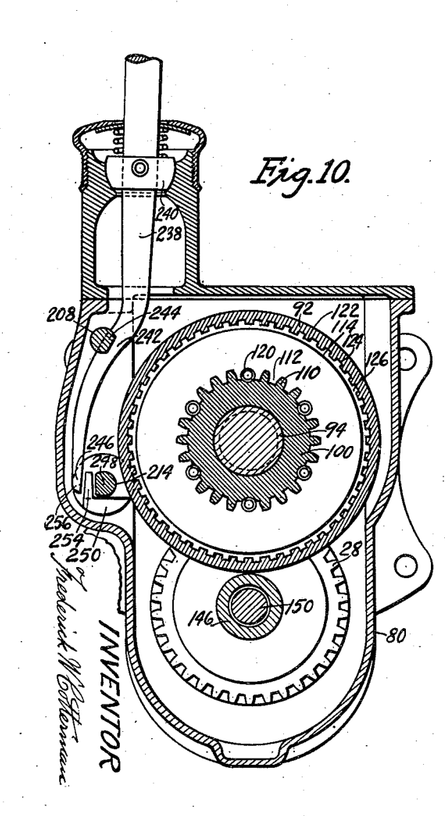
Fig. 10 is a transverse section taken through the speed torque operated clutch at 10—10 of Fig. 2.

The gear shift lever for moving the shifting forks 204 and 206 is shown in Figs. 6, 7 and 10. In Fig. 6 the first and second speed shifting rod 208 has sliding bearing in the hubs 210 and 212 while the reverse shifting rod 214 has sliding bearing in the hubs 216 and 218. A locking bar 220 is provided to lock either shifting bar in neutral position whenever the other is moved away from it. Spring actuated detent balls 222 resiliently hold the shifting rods in either of their several positions. The hubs 224 and 226 of the shifting forks 204 and 206 are held to the shifting rods 208 and 214 by the screws 228. The shifting forks 204 and 206 are further guided in their axial movement by the small rods 230 and 232 which are supported in the ends of the housing 82. Hubs 234 and 236 on forks 204 and 206 respectively have holes slidably fitted to the rods 230 and 232.

The gear shift lever 238 is movable in the ball joint 240 (see Figs. 6 and 10.) Arcuate edges 242 may be entered into a notch 244 of the shifting rod 208 to move the rod forwardly or rearwardly. Other arcuate edges 246 may be entered into the notch 248 of the shifting rod 214 to move the rod forwardly or rearwardly. A guide member 250 is anchored in the housing 80 at 252.

This guide member has a transverse notch 254 through which the end 256 of the lever 238 may pass if it is brought to the neutral position. When the end 256 passes through the notch 254 in one direction the arcuate edges 246 will enter the notch 248 of the shifting rod 214, but when the end 256 passes through the notch 254 in the other direction the arcuate edges 242 will enter the notch 244 of the shifting rod 208.

Because of the fact that the distance from the ball joint 240 to the reverse shifting rod 214 is greater than the distance from the ball joint 240 to the first and second speed shifting rod 208, the rod 214 has a much greater movement with the same angular movement of the gear shift lever 238 than the rod 208. This is in accordance with the requirements inasmuch as the reverse idler gear 64 must be moved axially a much greater distance than the synchromesh collar 54.

Proportion

The mechanisms, when the sizes and proportions of the parts are as shown, are intended to be used with an engine which will develop 90 H. P., at 4000 R. P. M., which is 115 foot pounds at 4000 R. P. M., but which will develop about 170 foot pounds at 2000 R. P. M. The forward gear set 20 has a ratio of 2 to 1 while the rearward set 22 has a ratio of 1½ to 1.

The silent gears are all 10 pitch 20 P. A. The tooth angles of the gears 24, 26, 46 and 48 are 32° 20', 26° 48', 20° 35' and 18° 20' respectively; their thrusts are 855, 891, 955 and 1085 respectively; and the numbers of teeth are 23, 34, 27 and 34 respectively.

The numbers of teeth of countershaft gears 28, 30, 50 and 52 are 34, 25, 29 and 24 respectively. The gear center of gear set 20 is $3\frac{5}{16}''$ and of gear set 22 is 3''.

The reversing gears are 8 pitch 20 P. A. The numbers of teeth of gears 62, 64 and 60 are 16, 17 and 27 respectively. The reversing ratio is normally 3.64 to 1 except that if the automatic clutch 32 operates while reversing, the ratio will be 1.82 to 1.

When in first speed the power passes through gears 24, 28, 30, 26, 46, 50, 52, 48 through clutch 56, 196 to shaft 176. When the gear shift lever is moved to second speed the power passes through gears 24, 28, 30, 26, 46 through clutch 58, 196 to shaft 176.

If the automatic clutch 32 operates while first speed is effective the power will pass through gears 24, 26, 46, 50, 52, 48 through clutch 56, 196 to shaft 176 and third speed is thereby provided. But if the automatic clutch 32 operates while second speed is effective the power will pass through gears 24, 26, 46 through clutch 58, 196 to shaft 176 and fourth speed is thereby provided.

First, second, third and fourth speeds have ratios of 3, 2, 1½ and 1 respectively. These speeds are too low for a standard axle and are therefore meant to be used with a fast axle as for instance a 3⅓ to 1 axle. This gives total engine to wheel ratios for first, second, third and fourth speeds of 10, 6⅔, 5 and 3⅓. The first speed of 10 is but slightly faster than standard, but the fourth speed of 3⅓ compares substantially to what is had when a 24% overdrive is used with a standard axle.

Similarly, with a 3½ to 1 fast axle, the engine-to-wheel ratios would be 10½, 7, 5¼ and 3½, in which the low speed is substantially standard, while the highest speed is about the same total ratio as would be had if a 17% overdrive were used with a standard axle. The latter is preferably used and is hereinafter considered inasmuch as a 17% overdrive may be advantageously employed from 30 M. P. H., up while a 25% overdrive may usually not be advantageously used until after 40 M. P. H., is attained.

The automatic multiple disc clutch has a stack of 27 discs. The total frictional area of 27 discs, both sides, is 574 square inches. When the pressure on the stack of discs falls below 600 pounds the clutch will slip if it is then carrying a torque load of 165 foot pounds.

The six centrifugal weights weigh a total of 2.73 pounds. They generate a total outward force of 2400 pounds at 4000 R. P. M., (see Fig. 11). They apply their pressure to the clutch discs through a leverage of 2.833 to 1. At 1725 R. P. M., they create an axial clutch engaging force of 1000 pounds. At this speed the automatic clutch will engage whether the operator so wills or not because the rearward thrust on the gear 26 due to load is never more than 1000 pounds even when maximum engine torque is being transmitted.

The spring 104 is compressed between the nut 108 and shoulder 106 with a pressure of 1000 pounds. This spring will yield and allow the clutch member 100 to move forwardly when the axial force applied by the weights 44 exceeds 1000 pounds.

When the weights 44 move outwardly, the light springs 120 yield and the clutch discs are compacted. The clutch adjusting nut 144 should be so adjusted that the shanks 134 move outwardly about half their total travel to completely compact the discs. But after the weights revolve 1725 R. P. M., they generate sufficient thrust against the clutch plates to cause the heavy spring 104 to yield whereupon the weights 44 move outwardly until the shanks 134 lie against the bottom of the deep keyways 128. The maximum force at any speed which the weights may apply to the clutch discs is 1000 pounds.

The small springs 120 each are exerting five pounds pressure to separate the discs 115 and 116. There are six springs 168 and they are each under a pressure of about two pounds.

Operation

The operation of the mechanism is as follows: With the vehicle at rest, the engine idling and disconnected from the transmission by the main clutch (not shown) the top of the gear shift lever is moved left and forward. Neither of the gears 60, 62 or 64 are now rotating and their teeth may perhaps be rotatably so positioned as to prevent the teeth of the gear 64 entering between the teeth of the gears 60 and 62. Should this occur, the operator may let in his main clutch momentarily and thereby slightly rotate the gear 62. The non-rotating gear 64 may now be pressed against the rotating gear 62 whereupon they will start to mesh. With both gears 62 and 64 slowly rotating, a further sliding of the gear 64 will mesh it with the gear 60. If, with the same rotatable positioning of the gears, the gear 60 had been wider than the gear 62, the operator could not have readily turned one with respect to the other to assist meshing. With gears 60, 62 and 64 meshed power will pass through gears 24, 28, 30, 26, 46, 50, 62, 64, 60 through clutch 196 to shaft 176 and the vehicle will move backward. This total engine-to-wheel reversing ratio is 12¾ to 1. But if the engine is sufficiently accelerated to cause the weights 44 to move the gear 26 forward against the load which is then urging it rearward, the power will pass through gears 24, 26, 46, 50, 62, 64, 60 through clutch 196 to shaft 176 and the reversing ratio will be 6⅜ to 1.

The top of the gear shift lever is now moved right and forward. This moves the synchromesh collar 54 rearward to engage the teeth 56. The power now passes through gears 24, 28, 30, 26, 46, 50, 52, 48, clutch 56, 196 to shaft 176, the total engine-to-wheel ratio being 10½ to 1. This is low gear or first speed.

If the accelerator pedal is now fully depressed to create maximum torque, and the engine is thereby speeded up from 0 to 3450 R. P. M., the rearward thrust which is created on the gear 26 will vary from 750 to 1070 then back to 880 pounds (see curve A Fig. 11).

During the same time that the engine is speeded up from 0 to 3450 R. P. M., the weights 44 have increased their speed from 0 to 1725 R. P. M., and caused a forward thrust on the gear 26 which varies at different speeds according to the curve B, Fig. 11.

Figure 11:
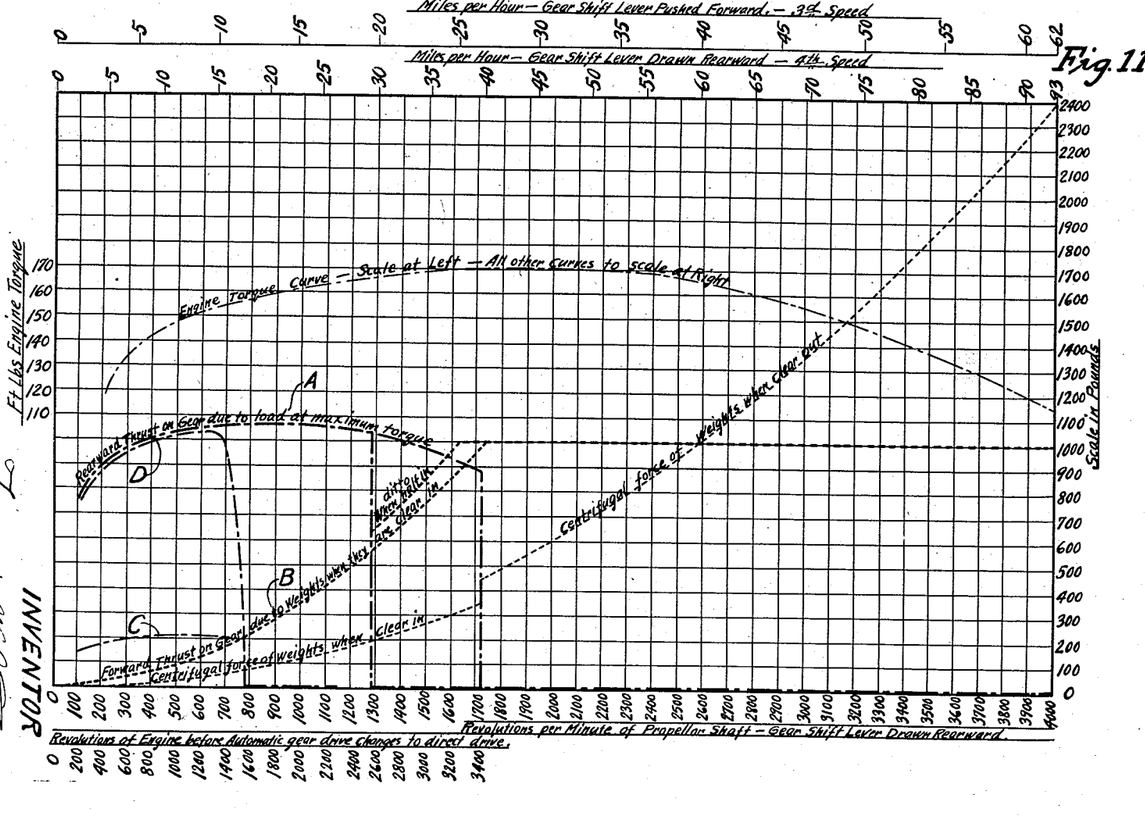
Fig. 11 is a performance diagram showing the speeds at which and the manner in which the speed and torque elements of the mechanism cooperate to control the automatic clutch.

It is obvious that whenever the curve A crosses the curve B a shift up from first speed to third speed is effected. The vehicle speed at which this occurs depends on the magnitude of the curve A. The curve A represents the maximum thrust that the engine can apply to the gear 26. But if a small amount only of fuel is fed to the engine it will create a thrust on the gear 26 as in the curve C in which the curve C will cross the curve B at 12 M. P. H.

Furthermore the operator may feed nearly the maximum fuel and thereby more rapidly accelerate the vehicle to 10 M. P. H., then quickly decrease the fuel, in which case he will create a thrust on gear 26 according to curve D and the shift up from first to third speed will again take place at about 12 M. P. H.

In the case of the curve C the vehicle was brought slowly to 12 M. P. H., in first speed then automatically shifted to third speed. In the case of the curve D the vehicle was brought more quickly up to 12 M. P. H., in first speed and then automatically shifted to third speed.

From the foregoing it will be seen that the automatic shift up from first to third speed will occur at different vehicle speeds depending on the amount of fuel being fed. With maximum fuel continuously being fed as in curve A the vehicle speed will rise rapidly to 27 M. P. H., in first and automatically shift to third. With one-fifth maximum fuel continuously being fed as in curve C, the speed will rise slowly to 12 M. P. H., in first and automatically shift to third.

With nearly full fuel being fed up to 10 M. P. H., as in the curve D and then reducing the fuel to about one-fifth full value the vehicle speed will rise rapidly to 12 M. P. H., in first speed then automatically shift to third. In the case represented by the curve C the operator does not wish to go faster than 12 M. P. H., and doesn't care how long it takes first speed to bring him up to 12 M. P. H., before it changes to third, while in the case represented by the curve D he does not wish to go faster than 12 M. P. H., but he wishes to be accelerated up to that 12 M. P. H., as rapidly as possible.

The automatic shift down from third speed to first speed likewise varies according as the power being generated is overbalanced by the load being encountered.

Thus if maximum power is being generated, and third speed is in effect, the automatic shift down to first speed will not occur until the vehicle speed has been forced down to 20 M. P. H. When less than maximum power is being generated, the shift down will occur at other points and may be made to occur by suddenly considerably increasing the fuel being fed. But after 20 M. P. H., has been reached in first, and a shifting up to third has occurred, even maximum fuel will not return to first speed except by a decrease in vehicle speed.

The foregoing speeds, that is, first and third are used for all city driving as well as for holding back the vehicle when descending very steep grades. While in the city limits the gear shift lever may be left in the forward position continuously, and automatic shifting up or down according to need will occur between first and third, that is, from a total engine-to-wheel ratio of 10½ to a total engine-to-wheel ratio of 5¼, and 10½ being standard for first speed and the 5¼ being very little slower than standard high speed, so that the step up from first to third speed does not differ greatly from the step up from first to second in the standard gearing.

When, however, the city limits are passed the driver preferably pulls the gear shift lever toward him and thereby causes the synchromesh collar 54 to engage the teeth 58 and thereby sets the mechanism for automatic shifting from second to fourth speed. Automatic shifting will now occur as needed except that whereas maximum power before prevented a shift up from first to third until 27 M. P. H. was reached, now maximum power will prevent a shift up from second to fourth speed until 40 M. P. H. is reached.

Also whereas the maximum power before prevented a shift down from third to first until the vehicle was reduced to 20 M. P. H., now the maximum power prevents a shift down from fourth to second until the vehicle speed is reduced to 30 M. P. H. The second speed having a total engine-to-wheel ratio of 7 is somewhat slower than the standard second speed of 6½ and will therefore be ample for starting on level road, for climbing unusual grades, for pulling back to speed after having been slowed up by a slow moving vehicle, etc. The fourth speed has a total engine-to-wheel ratio of 3½ which is about the ratio which would be had if a standard vehicle were equipped with a 17% overdrive.

It follows that, as long as driving is being done within city limits, the gear shift lever should be pushed forward into first speed and left there. The automatic unit will convert first into third speed whenever third speed is advisable, but when driving beyond city limits the gear shift lever should be drawn rearwardly into second speed and left there. This second speed the automatic unit will convert into a fourth speed when advisable.

When driving beyond city limits, if the operator stalls the engine on a steep hill he should move the gear shift lever to first speed position to again start. This same is true if he becomes stalled in a mud hole. If maximum getaway is desired the driver may always start in first speed. He may then either accelerate in first to about 8 M. P. H., then hand shift to second, then wait until the automatic unit shifts to fourth, or he may accelerate in first until the automatic unit changes first into third, then, after an interval, hand shift from third to fourth.

Generally speaking, a driver who never exceeds 35 M. P. H., should always drive with the gear shift lever in the forward position or first speed, while one whose speed averages around 60 M. P. H, should always drive with the gear shift lever in the rearward position or second speed, except when making a difficult start from a dead stop or when maximum acceleration is desired, in which case he should momentarily change to first speed position.

Advantages

With modern vehicles of the class weighing about 2600 to 2900 pounds having engines which develop 80 to 90 H. P., at 3500 to 3800 R. P. M., and total engine-to-wheel ratios of about 10½, 6½ and 4⅛ it is possible to move 60 to 70 M. P. H., in second speed by speeding the engine up to 4800 to 5600 R. P. M., but it is surely not conducive of economy of operation nor good for the mechanism. The same vehicle may be moved 90 M. P. H., in third speed by revolving the engine 4600 R. P. M., but this is still a greater speed than the engine may revolve at efficiently.

Now by employing the automatic transmission herein disclosed with an engine developing 90 H. P., at 4000 R. P. M., the following results are attained. Whether the gear shift lever is set to first speed or second speed, an automatic shift up to third or fourth takes place when the engine passes 3450 R. P. M., at which speed the engine has reached a relatively low torque. When the automatic shift up takes place at this maximum point the engine is drawn back to 1725 R. P. M. This is its most efficient torque point.

If this shift up takes place when the gear shift lever is in first speed position it does so at 27 M. P. H., while if it takes place when the gear shift lever is in second speed position it takes place at 40 M. P. H. These are the maximum speeds at which the automatic gear set, proportioned as shown, may be kept in gear drive with an engine of the power designated.

With the gear shift lever in first speed and the automatic unit changed to direct drive we have third speed. We may now reach about 65 M. P. H., by revolving the engine 4200 R. P. M. If the gear shift lever is in second speed and the automatic unit has changed to direct drive we have fourth speed. We may now reach about 90 M. P. H., by revolving the engine about 3900 R. P. M.

Lowering the engine speed from 5200 to 4200 and from 4600 to 3900 R. P. M., for the same vehicle speed, and still having a first speed equal to standard practice is an advantage which is obvious, and the fact that the gear shift lever need only be moved one direction to get more power and less speed and the other direction to get more speed and less power and need not be frequently shifted as in conventional practice, is a feature which will greatly simplify driving.

The proportion of the several parts of the structure and the values of speed and torque and the gear ratios herein given are, of course assumed for illustrative purposes only and may be varied greatly to suit different engine powers and vehicle weights without going outside the scope of the invention. To define this scope, I claim, 1. A four forward speed automotive transmission mechanism having main shafting comprising, a driving shaft, an intermediate shaft and a driven shaft in coaxial alignment, a first main shaft gear firmly secured on the driving shaft, a second main shaft gear secured to the intermediate shaft to rotate therewith but having slight axial movement with respect thereto, a third main shaft gear firmly secured to the intermediate shaft, a fourth main shaft gear freely rotatable on the driven shaft, a first, second, third and fourth countershaft gear in constant mesh with the said first, second, third and fourth main shaft gears respectively, means permanently connecting the third and fourth countershaft gears, an axially movable means for connecting the first and second countershaft gears, a second axially movable means for connecting the first and second main shart gears, and a third axially movable means for selectively connecting the driven shaft to the third or fourth main shaft gears, helical teeth on the second main shaft and the second countershaft gears angled to cause the axial thrust produced by the torque load thereon to urge said gears axially opposite thereby to urge the first said axially movable means in a direction to maintain disconnection of the first and second main shaft gears, and to maintain connection of the first and second countershaft gears, and automatic means to overcome the said axial thrust and thereby connect the first and second main shaft gears and keep the first and second countershaft gears disconnected.

2. An automatic power transmitting gear set comprising, a first and a second main shaft gear connectible for direct drive, a first and second countershaft gear in mesh with the first and second main shaft gears respectively, the second main shaft gear and the second countershaft gear both having slight axial movement, a friction clutch disengageable by axial movement of the second main shaft gear to disconnect the first and second main shaft gears from direct drive, a second clutch operative by axial movement of the second countershaft gear to connect the first and second countershaft gears for gear drive, screw means for urging engagement of the second said clutch, helical teeth on the second main shaft gear and second countershaft gear angled to cause the axial thrust due to the torque transmitted thereby to maintain the second clutch in engagement when the second countershaft gear drives the second main shaft gear and to maintain disengagement of the second said clutch when the first clutch is engaged and the second main shaft gear thereby drives the second countershaft gear.

3. Power transmitting mechanism comprising, a first and a second main shaft gear, a first and a second countershaft gear in mesh with said first and second main shaft gears respectively, a main shaft clutch for connecting said first and second main shaft gears directly, axially engageable clutch parts one carried by each said countershaft gear, light friction means retarding relative rotative movement between the two countershaft gears, screw means capable of overcoming said light friction means operative to move one of said countershaft gears toward the other to engage said axially engageable clutch parts, and helical teeth on one said countershaft gear angled to cause the thrust due to the torque being transmitted to assist said screw means to engage said axially engageable clutch parts when said second countershaft gear drives said second main shaft gear but to maintain disengagement of said axially engageable clutch parts when said main shaft clutch becomes engaged and said second main shaft gear thereby drives said second countershaft gear.

4. Power transmitting mechanism comprising, a first and a second main shaft gear, a first and a second countershaft gear in mesh with said first and second main shaft gears respectively, a main shaft clutch for connecting said first and second main shaft gears directly, axially engageable clutch parts one carried by each said countershaft gear, friction means retarding free rotative movement between the first and second countershaft gears, resilient means maintaining engagement of said friction means below a predetermined rotative speed, said resilient means being overcome by the centrifugal force of a part of said friction means above said predetermined rotative speed, and helical teeth on one said countershaft gear angled to cause axial movement in a direction to engage said axially engageable clutch parts when said one countershaft gear is being rotated through said friction means by said other countershaft gear.

5. In a power transmitting device, a driven clutch mechanism comprising a shaft, a driven clutch member having sliding keyed connection to said shaft, and a plurality of driven friction discs carried by said clutch member, a driving clutch member, a plurality of driving friction discs held by said driving clutch member between the driven friction discs, resilient means normally holding the two outside friction discs apart, and centrifugal weight members fulcrumed on said shaft operable outwardly from the axis to press one of the outside discs toward the other outside disc, and a resilient stop carried on said shaft for the said other outside disc yieldable when a predetermined maximum pressure is applied to the first said outside disc by said weight members.

6. An automotive power transmitting gear set comprising, two main shaft gears having two normally connected countershaft gears in constant mesh therewith, a drive shaft positively secured to the first main shaft gear, a second shaft secured in the second main shaft gear to rotate therewith, a disc clutch between the first and second main shaft gears for connecting them directly and independently of the countershaft gears, the driven plates of said clutch having keyed connection to said second shaft, resilient means forcing the clutch discs apart, means secured to the second said shaft for forcing one outer clutch disc toward the other outer clutch disc to compact said discs and overcome said resilient means, a resilient stop on the second said shaft yieldable to allow the clutch discs to move bodily in an axial direction after a determined pressure on said discs is exceeded, and means to disconnect the first and second countershaft gears when the disc clutch becomes engaged.

7. In power transmitting mechanism, a driving and a driven gear in axial alignment, a clutch for connecting said gears directly, gear means for connecting the gears around the clutch upon disengagement thereof, and a centrifugal device for engaging said clutch comprising hinge means at one end of said driven gear, weight means at the other end of said driven gear and shanks connecting said hinge means to said weight means, said shanks extending through the inside of said driven gear.

8. The combination in a power transmitting device of a driving and a driven gear in axial alignment, a shaft within said gears, speed reducing gearing connecting said gears, a clutch for connecting said gears directly, and centrifugal members for engaging said clutch comprising hinge parts hinged at one end to said driven gear, weight portions at the opposite end of said driven gear, a fulcrum portion secured to said shaft, and long shanks connecting the hinge parts to the weight portions, said shanks being operable outwardly by said weights into deep internal keyways in said driven gear.

9. The combination in a power transmitting device, of a main driving shaft, a driving gear and a driving clutch member rigidly secured to said main driving shaft, an axially aligned second main shaft having deep external keyways, a second gear having deep internal keyways axially slidable on said second main shaft, two countershaft gears one in constant mesh with each of said main shaft gears, an axially compressible clutch between the two main shaft gears for joining them together directly, key members extending outwardly into the deep keyways of the second main shaft gears and inwardly into the deep keyways of the second main shaft, hinge means joining said key members to said second main shaft gear and fulcrum means extending from the inner ends of said key means into openings in said second main shaft, operating arms extending from said key means through the said deep keyways in the said gear and shaft, and centrifugal weights on the ends of said arms at the other end of said gear.

10. Power transmitting mechanism comprising, two main shaft gears, two countershaft gears in mesh with said main shaft gears, a driven shaft normally freely rotatable within said main shaft gears, an axially shiftable collar normally midway between said main shaft gears having splined connection to said driven shaft and having clutching means at the ends, corresponding clutching means on the faces of the main shaft gears, a gear on the outside of said collar, a third countershaft gear between the two aforesaid countershaft gears in line with but not in mesh with said gear on said collar, the three said countershaft gears being joined to revolve in unison, and one idler gear normally positioned not to be engaged by said collar gear when said collar is shifted to engage the clutch parts on said main shaft gears but axially slidable into mesh with both the collar gear and the last mentioned countershaft gear when said collar gear is in its normal position.

11. In a power transmitting device, a driving member, a driven member, main clutch means for connecting said members for rotation in unison, gears for connecting said members for rotation at different speeds, and gear connecting clutch means, operative upon disconnection of said main clutch means, comprising a driven jaw clutch element and helical teeth on one of said gears, a driving jaw clutch element kept rotating by the driving member, jaw clutch engagement guiding means associated with the driving and driven jaw clutch elements and registering with their respective teeth, the helical teeth on said gear being angled to urge jaw clutch engagement when it is being driven thru the driving member and to urge jaw clutch disengagement when it is being driven thru the driven member.

12. In a power transmitting device, a driving member, a driven member, main clutch means for connecting said members for rotation in unison, a helical gear on the driven member, a second helical gear in mesh with the first said gear, a driven jaw clutch element on said second gear, a driving jaw clutch element kept rotating by the driving member, said jaw clutch elements being engageable by relative axial movement thereof, guide means on one jaw clutch member and follower means on the other each in registry with their respective jaw clutch teeth to guide them into engagement, with the teeth of one jaw clutch member entering between the mating teeth of the other, the helical teeth on said gears being angled to urge axial movement of the second gear to engage the jaw clutch when the second gear drives the first and axial movement of the second gear to disengage the jaw clutch when the main clutch is engaged and the first gear thereby drives the second.

13. In a power transmitting device, a driving member, a driven member, a main clutch for connecting said members for rotation in unison, a helical gear on the driven member, a second helical gear in mesh with the first said gear, a driven jaw clutch element on said second gear, a driving jaw clutch element kept rotating by the driving member, said jaw clutch elements being engageable by relative axial movement thereof, helical guide means on one jaw clutch member and appropriate follower means on the other jaw clutch member, each in permanent registry with their respective jaw clutch teeth to guide them into engagement, with the teeth of one jaw clutch member in line with the spaces between the teeth of the other, the helical teeth on said gears being of such hand as will urge axial movement of the second gear to engage the jaw clutch when the second gear drives the first, and axial movement of the second gear to disengage the jaw clutch when the main clutch is engaged and the first gear thereby drives the second, the helix of the guide means being of the opposite hand as that of the helical gears.

14. In a power transmitting device, a driving member, a driven member, a main clutch for connecting said members for rotation in unison, a helical gear on the driven member, a second helical gear in mesh with the first said gear, a driven jaw clutch element on said second gear, a driving jaw clutch element kept rotating by the driving member, said jaw clutch elements having unidirectional driving teeth the backs of which are somewhat helical, the teeth of the respective elements being operative into and out of engagement by relative helical movement toward or away from each other, helical guide means on one jaw clutch member and appropriate follower means on the other jaw clutch member, each in fixed position circumferentially in relation to their respective jaw clutch teeth to guide them into engagement with the teeth of one jaw clutch member circumferentially midway of the teeth of the other, the helical teeth on said gears being of such hand as will produce an end thrust urging engagement of the jaw clutch elements when the second gear drives the first and will produce an end thrust urging disengagement of the jaw clutch elements when the main clutch is engaged and the first gear thereby drives the second, the helix angle of the backs of the jaw teeth and of the guide means both being of a hand opposite to that of the helical gear teeth.

15. In a power transmitting device, a driving member, a driven member, a main clutch for connecting said members for rotation in unison, a helical gear on the driven member, a second helical gear in mesh with the first, a driven jaw clutch element on the said second gear, a driving jaw clutch element kept rotating by the driving member, said jaw clutch elements having unidirectional jaw teeth the backs of which are somewhat helical, one of said jaw clutch members having helical guiding grooves of the same hand as the said jaw teeth in fixed circumferential registry with its jaw teeth, all said helical guiding grooves terminating at one end in a circular groove, the other jaw clutch member having followers located in fixed circumferential registry with its jaw teeth extending into said guide grooves whereby the teeth of the jaw clutch members are guided into engagement with the fronts of the teeth of one circumferentially midway of the fronts of the teeth of the other, the helix angle of the gear teeth being of opposite hand as the jaw teeth and guide grooves and such as to create an axial thrust urging jaw clutch engagement when the second gear drives the first and urging jaw clutch disengagement when the first gear drives the second, the followers extending into and passing around the circular groove when the jaw clutch is in the disengaged position and the jaw clutch members are rotating at different speeds.

16. The structure defined in claim 15 wherein the guide grooves get deeper as they recede from the circular groove.

17. The structure defined in claim 15 wherein the followers have spherical inner ends, and the guide grooves and circular groove are arcuate in cross section to correspond thereto, and wherein springs constantly urge the followers against the bottoms of either the circular groove or the guide grooves.

18. The structure defined in claim 15 wherein the followers are pressed radially inward against the bottoms of the guide grooves by springs, and the weight of the followers and the strength of the springs are so proportioned that the centrifugal force of the followers outwardly exceeds the pressure of the springs inwardly at speeds in excess of those which are attainable when the driving member is driving the driven member thru the gearing.

19. In a power transmitting device, a driving member, a driven member, gearing, jaw clutch parts for connecting said members through said gearing, helical teeth on one of said gears operative by end thrust due to load thereon to urge one said jaw clutch part toward engagement with the other, and guiding means for guiding said jaw clutch part, whereby the teeth of one jaw clutch part are guided to enter midway between the teeth of the other jaw clutch part.

20. In a power transmitting device, a driving member, a driven member, gearing, jaw clutch parts for connecting said members through said gearing, helical teeth on one of said gears operative by end thrust due to the load thereon to start movement of one jaw clutch part toward engagement with the other, and helical guide and follower means operative to assist the said movement of the said one jaw clutch part and to guide the said one jaw clutch part to cause the teeth of the said one jaw clutch part to enter midway of the teeth of the other jaw clutch part.

21. In a power transmitting device, a driving member, a driven member, gearing, two jaw clutch parts one engageable with the other for connecting said members through said gearing, helical teeth on at least one of said gears angled to cause axial movement of said gear due to torque carried by said teeth, one jaw clutch part being connected to said gear for axial movement therewith, guide means in permanent registry with the teeth of one clutch part and follower means in permanent registry with the teeth of the other clutch part whereby the teeth of one clutch part may be guided into correct engagement with the teeth of the other clutch part.

22. In a power transmitting device, a driving member, a driven member, gearing, two jaw clutch parts one movable axially into engagement with the other by axial movement of one of said gears for connecting said members through said gearing, helical guide grooves in permanent registry with the teeth of one of the jaw clutch parts, follower means in permanent registry with the teeth of the other of the jaw clutch parts, an annular groove for said follower means, and helical teeth on the axially movable gear angled to cause said gear to move axially and move said follower means out of said annular groove and into said helical guide grooves and to further move said follower means along said guide grooves whereby the teeth of one jaw clutch part are made to enter into the spaces between the teeth of the other jaw clutch part.

23. In a power transmitting device, a driving member, a driven member, gearing, means for connecting said members through said gearing comprising two jaw clutch parts one secured to one of said gears and movable axially therewith, jaw teeth, helical guide grooves and an annular portion carried by one of said jaw clutch parts, jaw teeth and follower means carried by the other of said jaw clutch parts, resilient means pressing said follower means into frictional engagement with said annular portion whereby the said one gear and its clutch part is rotatably driven by friction when the jaw teeth are out of engagement, helical teeth on said one gear angled to move said follower means axially off of said annular portion and into said helical grooves when said gear teeth are driven against a load resistance, the angle of said helical teeth and said helical grooves being such as to cause movement of the one clutch part into engagement with the other with the teeth of one clutch part entering into the spaces between the teeth of the other clutch part.

24. The structure defined in claim 23 wherein the guide grooves and followers have their contacting surfaces rounded whereby when said followers are urged by the helical gear teeth toward the guide grooves with the followers midway between the guide grooves, the said followers may rise upwardly against the resilient means until the followers and guide grooves come into registry by relative rotation of the jaw clutch parts.

25. The structure defined in claim 23 wherein the guide grooves get deeper as they approach the jaw teeth with which they are in registry.

26. The structure defined in claim 23 wherein the centrifugal force due to the weight of the followers overcomes the resilient means at a predetermined rotative speed whereby frictional contact between the followers and guide grooves is eliminated.

27. A high-and-low-forward and reverse gear-set comprising, a driving gear, a sliding gear, a driven gear and a driven shaft all coaxially aligned, the driven gear being freely rotatable on the driven shaft and the sliding gear being splinedly mounted thereon between the driving and driven gears, clutch means on the driving and driven gears adjacent the sliding gear, corresponding clutch means on the faces of the sliding gear adapted for engagement with the clutch means of the driving and driven gears, a countershaft carrying three gears secured to rotate together, the end countershaft gears being in mesh with the driving and driven gears respectively and the middle countershaft gear being in the same plane with but not in mesh with the sliding gear, an idler shaft, and an idler gear freely rotatable on the idler shaft and axially slidable thereon into mesh with both the sliding gear and the middle countershaft gear.

28. The structure defined in claim 27 wherein the face of the middle countershaft gear is of greater width than the face of the sliding gear, whereby the idler gear may engage and be rotated by said middle countershaft gear before said idler gear starts to engage the sliding gear.

FREDERICK W. COTTERMAN.